US012779958B2

(12) United States Patent
Kanai

(10) Patent No.: US 12,779,958 B2
(45) Date of Patent: Nov. 3, 2026

(54) VEHICLE DOOR STRUCTURE

(71) Applicant: SUBARU CORPORATION, Tokyo (JP)

(72) Inventor: Isao Kanai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 441 days.

(21) Appl. No.: 18/374,239

(22) Filed: Sep. 28, 2023

(65) Prior Publication Data

US 2024/0116336 A1 Apr. 11, 2024

(30) Foreign Application Priority Data

Oct. 11, 2022 (JP) ................................ 2022-163609

(51) Int. Cl.
*B60J 5/04* (2006.01)
*B60J 10/76* (2016.01)

(52) U.S. Cl.
CPC ............. *B60J 5/0402* (2013.01); *B60J 10/76* (2016.02)

(58) Field of Classification Search
CPC ........... B60J 10/76; B60J 10/74; B60J 5/0402
See application file for complete search history.

(56) References Cited

U.S. PATENT DOCUMENTS 6,220,650 B1 * 4/2001 Davis ........................ B60J 10/78 296/146.16

FOREIGN PATENT DOCUMENTS

JP 2016-55704 A 4/2016

* cited by examiner

*Primary Examiner* — Nicholas McFall
*Assistant Examiner* — Eric Acosta
(74) *Attorney, Agent, or Firm* — MCGINN INTELLECTUAL PROPERTY LAW GROUP, PLLC

(57) ABSTRACT

A vehicle door structure includes a door sash that includes an outer door sash, an inner door sash, and an auxiliary bracket. The outer door sash is provided on an outer side of the door sash in a vehicle width direction and forms a glass guide for a door window. The inner door sash is provided on an inner side of the door sash in the vehicle width direction and coupled to an inner side of the outer door sash in the vehicle width direction. The auxiliary bracket extends in a vehicle vertical direction on a rear portion of the door sash and is interposed and coupled between the outer door sash and the inner door sash. The auxiliary bracket is provided so as to cover a gap between the outer door sash and the inner door sash at an upper rear corner of the door sash.

20 Claims, 4 Drawing Sheets

VEHICLE DOOR STRUCTURE

CROSS-REFERENCE TO RELATED APPLICATIONS

The present application claims priority from Japanese Patent Application No. 2022-163609 filed on Oct. 11, 2022, the entire contents of which are hereby incorporated by reference.

BACKGROUND

The disclosure relates to a vehicle door structure.

In general, a vehicle door with a sash has been widely used. The vehicle door has a door body that includes an outer door panel and an inner door panel, and the sash surrounds a door glass window provided above the door body. Such a vehicle door includes a weather strip or the like between the sash and the vehicle body to prevent outside rainwater or the like from entering the vehicle when the vehicle door is closed. The weather strip is in close contact between the sash and the vehicle body to prevent outside water drops from entering the vehicle, for example.

The sash includes an outer sash and an inner sash coupled to each other. The outer sash includes a glass run that guides the door glass window to slide. The inner sash is provided with a clip attachment hole or the like to which the weather strip is attached.

Various loads such as a load from the door glass window, a load generated upon opening or closing the vehicle door, and a load generated upon contact with an obstacle are applied to the vehicle door. The components of the vehicle door therefore are to be resistant to these loads.

Japanese Unexamined Patent Application Publication (JP-A) No. 2016-55704, for example, discloses a technique to reinforce a vehicle door frame. In JP-A No. 2016-55704, the vehicle door includes a columnar sash (door sash) that includes a first frame member (an outer sash) and a second frame member (an inner sash) combined with each other. The first frame member has a channel part that holds an edge of the door glass window in a vertically movable manner. The second frame member has a protrusion that protrudes to a vehicle inner side relative to the channel part of the first frame member. The columnar sash and a door panel are joined to each other with a bracket. The bracket has a frame joint part that protrudes upward from a fixing part fixed to the door panel and is inserted into between the first frame member and the second frame member.

SUMMARY

An aspect of the disclosure provides a vehicle door structure that includes a door sash. The door sash is provided on an upper portion of a vehicle door and surrounds a door window. The door sash includes an outer door sash, an inner door sash, and an auxiliary bracket. The outer door sash is provided on an outer side of the door sash in a vehicle width direction and forms a glass guide for the door window. The inner door sash is provided on an inner side of the door sash in the vehicle width direction, and is coupled to an inner side of the outer door sash in the vehicle width direction. The auxiliary bracket extends in a vehicle vertical direction on a rear portion of the door sash, and is interposed and coupled between the outer door sash and the inner door sash. The auxiliary bracket is provided so as to cover a gap between the outer door sash and the inner door sash at an upper rear corner of the door sash.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
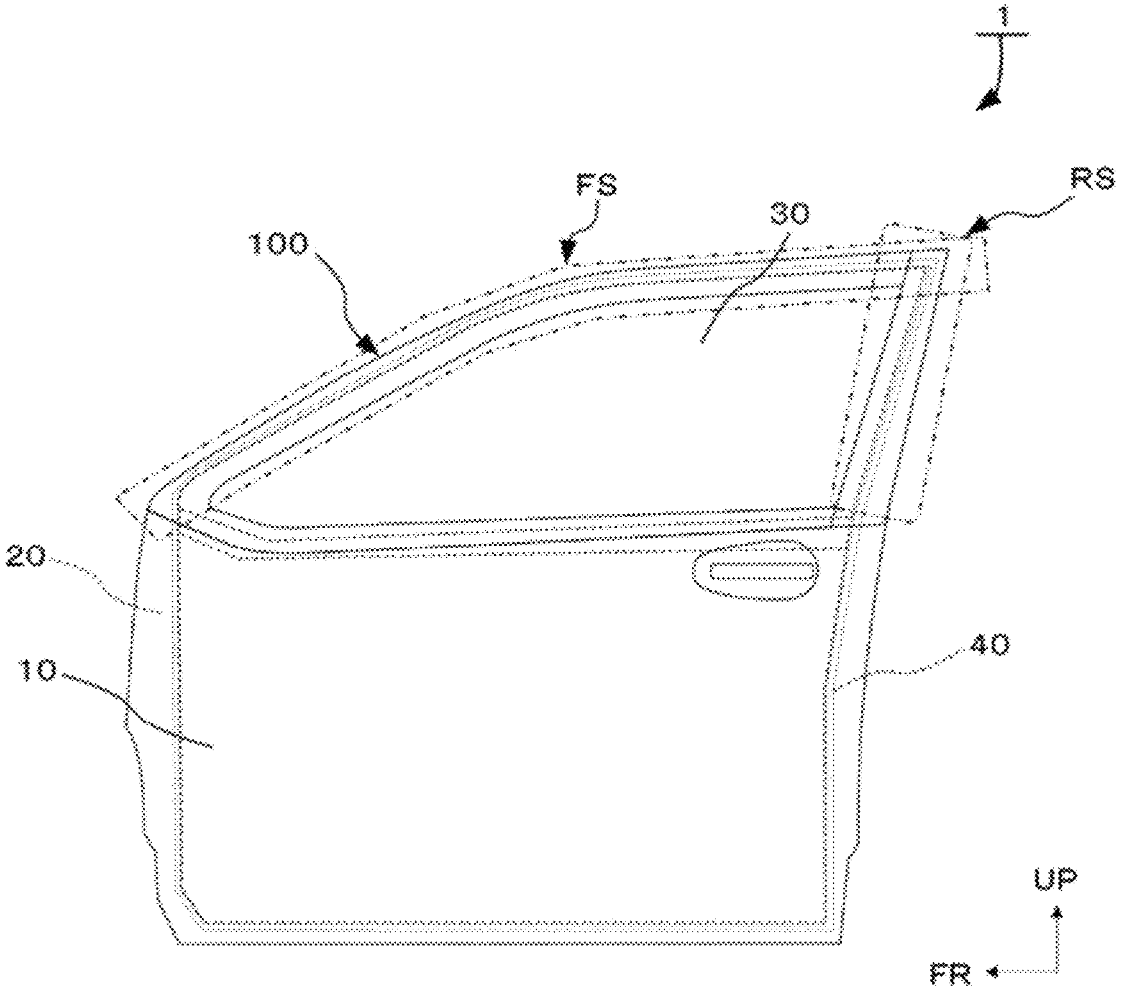
FIG. 1 is a schematic view of a vehicle door according to one example embodiment of the disclosure as seen from outside the vehicle in a vehicle width direction.

The technique disclosed in JP-A No. 2016-55704, which uses the bracket to reinforce the outer sash and the inner sash, has a difficulty in preventing rainwater or the like from entering the vehicle through a rear-side sash, the door panel, or a gap between the outer sash and the inner sash coupled to each other, for example. In a case where the outer sash is a member formed by a roll forming method, rainwater enters the vehicle through, for example, a gap between the outer sash and the inner sash at an upper rear corner of the vehicle door in some cases.

It is desirable to provide a vehicle door structure having improved rigidity and preventing water immersion from the upper rear corner of the door sash.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A vehicle door 1 according to an example embodiment of the disclosure to be attached to a vehicle V will now be described with reference to FIGS. 1 to 4. Note that arrows FR, UP, and LH illustrated in the drawings as needed represent a frontward direction, an upward direction, and a leftward direction in front view of the vehicle V, respectively. Note that the upward and downward directions (vehicle vertical direction), the frontward and rearward directions, and the leftward and rightward directions (vehicle width direction) used in the following description are directions in front view of the vehicle V unless otherwise stated.

Example Embodiment

An exemplary configuration of the vehicle door 1 will now be described with reference to FIGS. 1 to 4. In an example described below, the vehicle door 1 is attached to the right side in front view of the vehicle V.

<Exemplary Configuration of Vehicle Door 1>

As illustrated in FIG. 1, the vehicle door 1 may include an outer panel 10, an inner panel 20, a door window 30, a weather strip 40, and a door sash 100.

Although not illustrated, a vehicle body is formed inside the vehicle door 1 in the vehicle width direction.

[Outer Panel 10 and Inner Panel 20]

The outer panel 10 may be an outer plate member of the vehicle door 1. The inner panel 20 may be an inner plate member of the vehicle door 1. The inner panel 20 may be disposed inward from the outer panel 10 in the vehicle width direction. The outer panel 10 and the inner panel 20 may be formed by pressing metal plates, for example.

The outer panel 10 and the inner panel 20 may be combined with each other and coupled to each other at an upper-front end, a lower-front end, an upper-rear end, and a lower-rear end by welding, for example. An inner space may be formed inside the door panel, i.e., between the outer panel 10 and the inner panel 20. The outer panel 10 and the inner panel 20 may be each provided with a non-illustrated drain channel such as a drain groove or a drain hole through which water drops or the like are discharged from the inner space to outside the vehicle V.

[Door Window 30]

The door window 30 may be a reinforced glass plate attached to the vehicle door 1 in a vertically movable manner. When the door window 30 moves in the upward direction, the door sash 100 (to be described later) may be occluded. The door window 30 may have a substantially trapezoidal shape having a front end edge and a rear end edge that are formed along respective slopes of the door sash 100 in side view of the vehicle V.

[Weather Strip 40]

The weather strip 40 may surround an inner side of the vehicle door 1 from the inner panel 20 to the door sash 100 in the vehicle width direction. The weather strip 40 may be formed by shaping a soft resin or a rubber material, for example. The weather strip 40 may be fixed with clips CP fit in fitting portions CH of the door sash 100, for example.

<Exemplary Configuration of Door Sash 100>

The door sash 100 is provided on an upper portion of the vehicle door 1 and surrounds the door window 30. The door sash 100 may include a front door sash FS and a rear door sash RS. The front door sash FS may be inclined in the upward direction from a joint portion between the outer panel 10 and the inner panel 20 located at a front portion of the vehicle V toward a rear portion of the vehicle V, and may extend in the rearward direction of the vehicle V. The rear door sash RS may extend in the vertical direction from a rear end of the front door sash FS to a joint portion between the outer panel 10 and the inner panel 20 located at the rear portion of the vehicle V.

Figure 2:
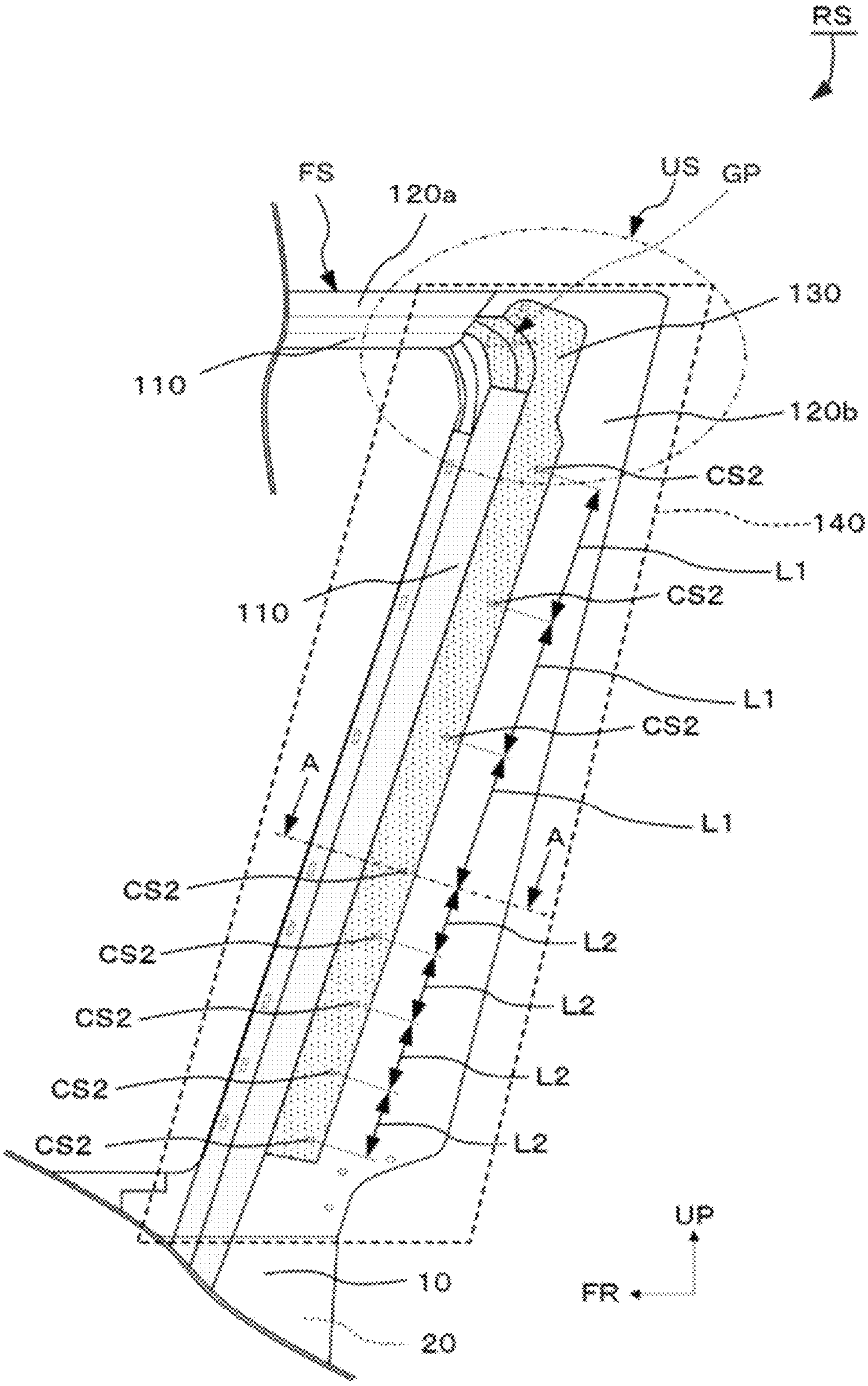
FIG. 2 is an enlarged view of a rear door sash RS illustrated in FIG. 1 from which a pillar garnish is removed, as seen from outside the vehicle in the vehicle width direction.

As illustrated in FIG. 2, the door sash 100 may further include an outer door sash 110, an inner door sashes **120*a* and 120*b*, an auxiliary bracket 130, and a pillar garnish 140**.

The door sash 100 may be formed by coupling the outer door sash 110, the inner door sashes **120*a* and 120*b*, and the auxiliary bracket 130** to each other by hemming processing or welding, for example.

[Front Door Sash FS]

The front door sash FS may be formed by coupling the outer door sash 110 and the inner door sash **120*a* to each other. The front door sash FS may form a front portion and an upper portion of the door sash 100**.

[Rear Door Sash RS]

The rear door sash RS may be formed by coupling the outer door sash 110, the inner door sash **120*b*, and the auxiliary bracket 130 to each other. The pillar garnish 140 (to be described later) may be provided outward from the rear door sash RS in the vehicle width direction. The rear door sash RS may form a rear portion of the door sash 100**.

Figure 3:
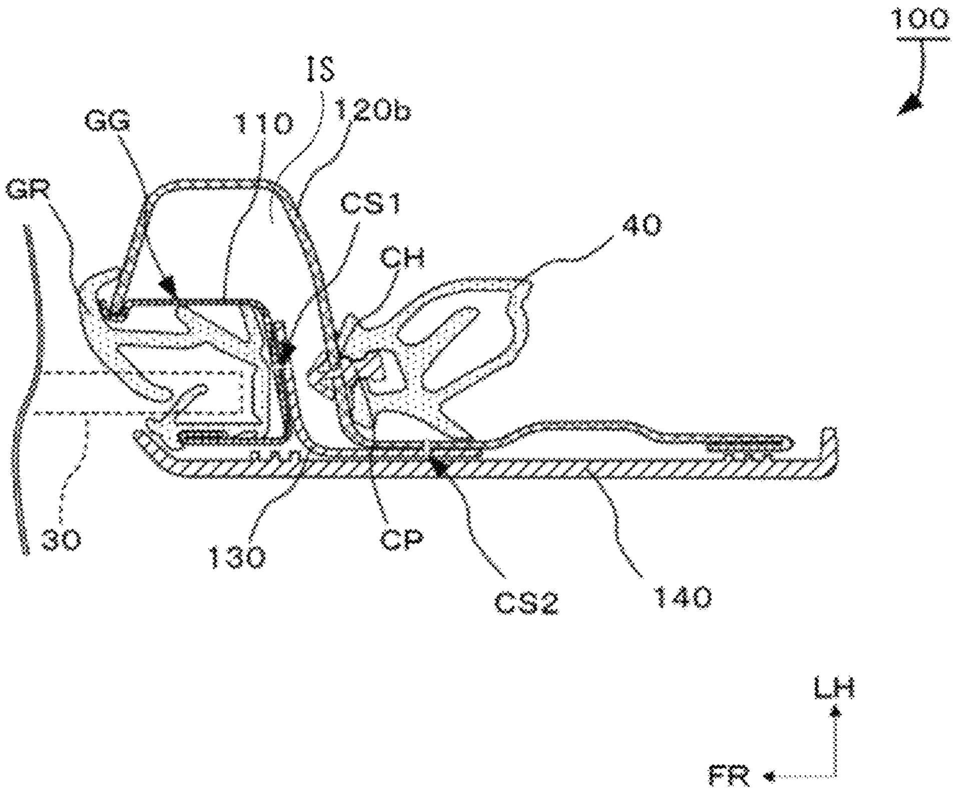
FIG. 3 is a cross-sectional view taken along a line A-A illustrated in FIG. 2.

As illustrated in FIG. 3, an inner space IS may be provided inside the rear door sash RS. The inner space IS may be a space surrounded by the outer door sash 110, the inner door sash **120*b*, and the auxiliary bracket 130. The outer door sash 110, the inner door sash 120*b*, and the auxiliary bracket 130** that surround the inner space IS of the rear door sash RS may be coupled to each other to form a closed cross-section.

[Outer Door Sash 110]

The outer door sash 110 may be a member formed by processing an elongated plate member, such as a metal plate, by a roll forming method, for example. The outer door sash 110 may be bent in a stepwise manner to have a predetermined cross-sectional shape. The outer door sash 110, the inner door sash **120*a* of the front door sash FS, and the inner door sash 120*b*** of the rear door sash RS may be formed by solid casting, for example.

The outer door sash 110 may form a glass guide GG that guides vertical movements of the door window 30. In a longitudinal cross-section as seen from above the vehicle V, the glass guide GG may have a substantially U shape that opens in the frontward direction. The glass guide GG may hold a glass run GR therein. The glass run GR may be formed by shaping a soft resin or a rubber material, for example.

A front-side inner edge of the outer door sash 110 may be fixed to a front-side edge of the inner door sash **120*b* (to be described later) by hemming processing, for example. Further, the outer door sash 110 may be coupled to the auxiliary bracket 130 at coupling sites CS1** provided on a rear side wall of the glass guide GG by welding, for example.

[Inner Door Sashes **120*a* and 120*b***]

The inner door sashes **120*a* and 120*b* may be members formed by pressing metal plates, for example. The inner door sashes 120*a* and 120*b* may be provided with the fitting portions CH into which the clips CP for fixing the weather strip 40 are fit. The inner door sash 120*a* may be a member of the front door sash FS, and the inner door sash 120*b*** may be a member of the rear door sash RS.

The front-side edge of the inner door sash **120*b* may be fixed to the front-side inner edge forming the glass guide GG by hemming processing, for example. A front portion of the inner door sash 120*b* may extend in the vertical direction and form a substantially U-shaped projection that protrudes from outside to inside in the vehicle width direction. On a rear portion of the inner door sash 120*b*, the fitting portions CH in which the clips CP are fit to fix the weather strip 40 may be provided. The inner door sash 120*b* may be bent into a substantially L-shape at a bent portion located rearward from the fitting portions CH, and may extend in the rearward direction. The inner door sash 120*b* may be coupled to the auxiliary bracket 130 (to be described later) at coupling sites CS2** located rearward from the bent portion by welding, for example.

[Auxiliary Bracket 130]

The auxiliary bracket 130 extends in the vertical direction on the rear portion of the door sash 100, and is interposed and coupled between the outer door sash 110 and the inner door sash 120*b*. The auxiliary bracket 130 may be a metal plate pressed into a substantially L-shape, for example. The auxiliary bracket 130 is provided so as to cover a gap GP formed at an upper rear corner US of the door sash 100 when the outer door sash 110 and the inner door sash 120*b* are coupled to each other.

In one example, the auxiliary bracket 130 may be coupled to the outer door sash 110 at the coupling sites CS1 provided on the rear side wall of the glass guide GG by welding, for example. The coupling sites CS1 may be provided at multiple sites on the rear side wall of the glass guide GG in the vertical direction. The auxiliary bracket 130 may be bent into a substantially L-shape at a portion located outward from the coupling sites CS1 in the vehicle width direction, and may be coupled to the inner door sash 120*b* at coupling sites CS2 by welding, for example. As illustrated in FIG. 2, an interval L2 between each two of the coupling sites CS2 adjacent to each other in the vertical direction on a lower portion of the door sash 100 may be narrower than an interval L1 between each two of the coupling sites CS2 adjacent to each other in the vertical direction on an upper portion of the door sash 100. The same may apply to the intervals between two of the coupling sites CS1.

[Pillar Garnish 140]

The pillar garnish 140 may be an exterior member attached to the door sash 100 from outside in the vehicle width direction. The pillar garnish 140 may include resin, for example. The pillar garnish 140 may secure the design of the door sash 100 and may be provided to prevent the components of the door sash 100 from being exposed to the outside in the vehicle width direction.

<Workings and Effects>

Workings and effects of the door sash 100 of the vehicle door 1 according to the example embodiment of the disclosure having the above-described structure are described with reference to FIGS. 3 and 4.

As illustrated in FIG. 3, the door sash 100 includes the outer door sash 110, the inner door sash 120*b*, and the auxiliary bracket 130 that are coupled to each other.

For example, the front-side inner edge of the outer door sash 110 may be fixed to the front-side edge of the inner door sash 120*b* by hemming processing, for example. The outer door sash 110 may be coupled to the auxiliary bracket 130 at the coupling sites CS1 provided on the rear side wall of the glass guide GG by welding, for example. The inner door sash 120*b* may be coupled to the auxiliary bracket 130 at the coupling sites CS2 on the rear portion of the door sash 100. The outer door sash 110, the inner door sash 120*b*, and the auxiliary bracket 130 that are coupled to each other may form the closed cross-section of the door sash 100.

As illustrated in FIG. 2, the interval L2 between each two of the coupling sites CS2 adjacent to each other in the vertical direction on the lower portion of the door sash 100 may be narrower than the interval L1 between each two of the coupling sites CS2 adjacent to each other in the vertical direction on the upper portion of the door sash 100. The same may apply to the intervals between two of the coupling sites CS1. For example, increasing the number of the welded sites (i.e., the coupling sites CS1 and CS2) on the lower portion of the door sash 100 improves mutual tensile strength of the outer door sash 110, the inner door sash 120*b*, and the auxiliary bracket 130. Thus, even when a load such as a vibration is transmitted to the door sash 100, the occurrence of a deformation of the lower portion of the door sash 100 is reduced.

Being interposed and coupled between the outer door sash 110 and the inner door sash 120*b*, the auxiliary bracket 130 has improved rigidity. This improves the rigidity of the door sash 100. For example, the rigidity of the auxiliary bracket 130 may be improved by increasing the plate thickness of the auxiliary bracket 130, or forming a rib on the auxiliary bracket 130.

The weather strip 40 may be provided rearward from the glass guide GG. This allows the weather strip 40 to be disposed not inside the vehicle compartment of the vehicle body but outside the vehicle compartment. This reduces constraints on the interior of the vehicle compartment of the vehicle body, and enlarges the cross-section of the interior of the vehicle compartment in the vehicle width direction.

The door sash 100 may be preliminarily provided with the drain channel to discharge water drops or the like generated from rainwater, washing water, or moisture condensation caused by temperature changes, for example. For example, after entering the inner space IS, the water drops or the like may pass through the inner space IS and the inner space of the door panel surrounded by the outer panel 10 and the inner panel 20, and may be discharged through the drain grooves or drain holes of the outer panel 10 and the inner panel 20 to the outside.

Figure 4:
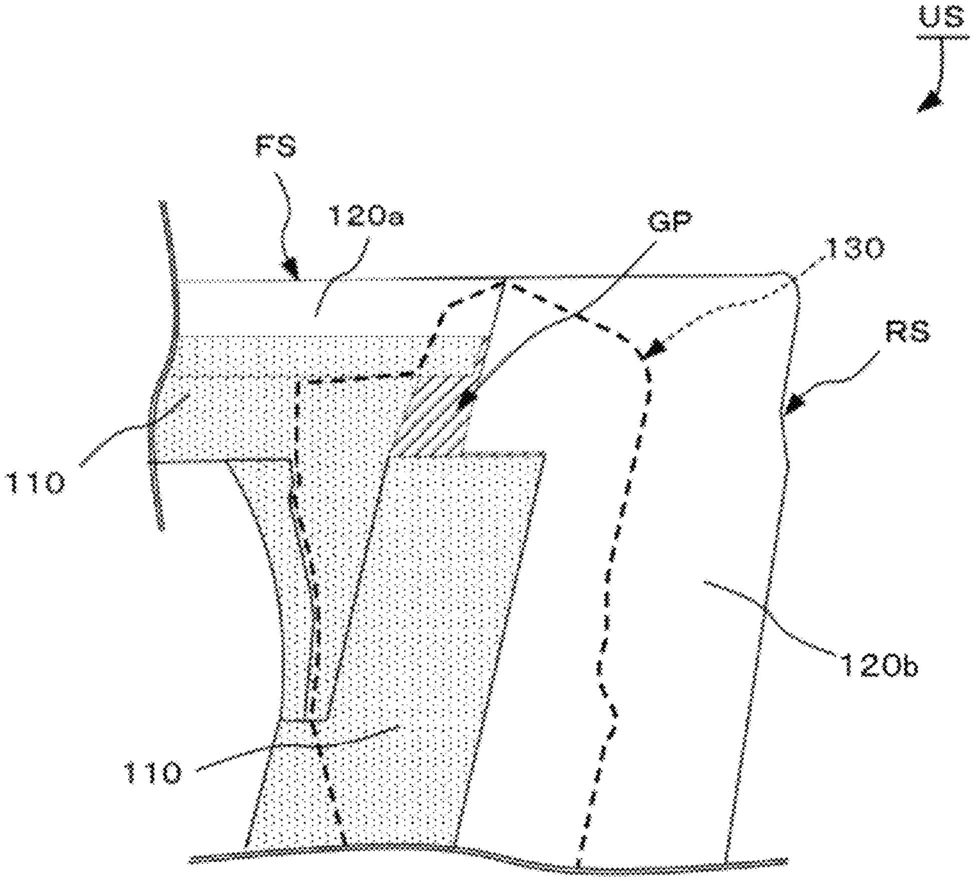
FIG. 4 is an enlarged view of a gap formed at an upper rear corner US illustrated in FIG. 2 from which the pillar garnish and an auxiliary bracket are removed, as seen from outside the vehicle in the vehicle width direction.

As illustrated in FIG. 4, the gap GP such as a hole may be formed when the outer door sash 110 processed by roll forming processing is joined to the inner door sash 120*b* formed by pressing a metal plate, for example. It is difficult to discharge water having entered the gap GP, which is different from the inner space IS, resulting in generation of rust in the gap GP. Accordingly, to prevent the water immersion through the gap GP, which is different from the inner space IS, the auxiliary bracket 130 may be provided so as to cover the gap GP. For example, the gap GP may be covered by coupling the outer door sash 110 to the auxiliary bracket 130 at the coupling sites CS1, and coupling the inner door sash 120*b* to the auxiliary bracket 130 at the coupling sites CS2.

Further, the outer door sash 110, the inner door sash 120*b*, and the auxiliary bracket 130 may be coupled to each other to form the closed cross-section, and the coupling sites may be provided at a narrow interval on the lower portion of the door sash 100. This improves the rigidity of the door sash 100. Accordingly, it is possible to reduce a deformation caused by a load such as a vibration transmitted to the door sash 100 and water immersion through the gap GP or other gaps caused by the deformation.

The vehicle door 1 according to the above-described example embodiment includes the door sash 100 provided on the upper portion of the vehicle door and surrounding the door window 30. The door sash 100 includes the outer door sash 110, the inner door sash 120*b*, and the auxiliary bracket 130. The outer door sash 110 is provided on the outer side of the door sash 100 in the vehicle width direction, and forms the glass guide GG for the door window 30. The inner door sash 120*b* is provided on the inner side of the door sash 100 in the vehicle width direction, and is coupled to the inner side of the outer door sash 110 in the vehicle width direction. The auxiliary bracket 130 extends in the vehicle vertical direction on the rear portion of the door sash 100, and is interposed and coupled between the outer door sash 110 and the inner door sash 120*b*. The auxiliary bracket 130 is provided so as to cover the gap between the outer door sash 110 and the inner door sash 120*b* at the upper rear corner US of the door sash 100.

That is, the gap GP, which is formed at the upper rear corner US of the door sash 100 when the outer door sash 110, which is a member processed by a roll forming method, and the inner door sash 120*b*, which is a member formed by pressing, for example, a metal plate, are coupled to each other, is covered by the auxiliary bracket 130. This prevents water drops from entering through the gap GP. Further, the outer door sash 110, the inner door sash 120*b*, and the auxiliary bracket 130 of the door sash 100 that are coupled to each other secure high rigidity of the door sash 100.

Accordingly, it is possible to improve the rigidity of the door sash while preventing water immersion through the upper rear corner US of the door sash 100.

Further, according to the vehicle door 1 of the present example embodiment, the inner space IS surrounded by the auxiliary bracket 130 and the inner door sash 120*b* may be formed between the coupling site CS1 at which the outer door sash 110 is coupled to the auxiliary bracket 130 and the coupling site CS2 at which the inner door sash 120*b* is coupled to the auxiliary bracket 130 in the vehicle width direction.

That is, the inner space IS of the inner door sash 120*b* allows the weather strip 40 to be disposed rearward from the glass guide GG. This allows the weather strip 40 to be disposed outward in the vehicle width direction. According to the vehicle door 1, gaps formed between the inner door sash 120*b* and the weather strip 40 are reduced, which reduces the occurrence of water immersion via the weather strip 40 provided on the inner door sash 120*b*. Further, the weather strip 40 is disposed rearward from the glass guide GG and thus disposed outside the vehicle compartment of the vehicle body. This enlarges the cross-section of the vehicle compartment in the vehicle-width direction, improving the rigidity and the collision performance. Further, the outer door sash 110, the inner door sash 120*b*, and the auxiliary bracket 130 of the door sash 100 that are coupled to each other and form the closed cross-section secures high rigidity.

Accordingly, it is possible to improve the rigidity while preventing water immersion through the upper rear corner US of the door sash.

Further, the vehicle door 1 of the present example embodiment may have the coupling sites CS1 at which the outer door sash 110 is coupled to the auxiliary bracket 130, and the coupling sites CS2 at which the inner door sash 120*b* is coupled to the auxiliary bracket 130. The interval L2 between each two of the coupling sites CS1 adjacent to each other in the vertical direction on the lower portion of the door sash 100 may be narrower than the interval L1 between each two of the coupling sites CS1 adjacent to each other in the vertical direction on the upper portion of the door sash 100. Similarly, the interval L2 between each two of the coupling sites CS2 adjacent to each other in the vertical direction on the lower portion of the door sash 100 may be narrower than the interval L1 between each two of the coupling sites CS2 adjacent to each other in the vertical direction on the upper portion of the door sash 100.

That is, the number of welded sites on the lower portion of the door sash 100 may be increased by reducing the interval L2 between each two of the coupling sites CS1 or CS2 adjacent to each other in the vertical direction. For example, the rigidity of the door sash 100 may be improved by improving the mutual tensile strength of the outer door sash 110, the inner door sash 120*b*, and the auxiliary bracket 130. The improvement of the rigidity of the door sash 100 makes it possible to reduce the occurrence of a deformation caused by a load transmitted to the door sash 100, and to prevent water immersion through the gap GP or other gaps caused by the deformation.

Accordingly, it is possible to improve the rigidity of the door sash while preventing water immersion through the upper rear corner of the door sash.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to improve the rigidity of the door sash while preventing water immersion through the upper rear corner of the door sash.

The invention claimed is:

1. A vehicle door structure comprising a door sash provided on an upper portion of a vehicle door and surrounding a door window, the door sash comprising:
- an outer door sash provided on an outer side of the door sash in a vehicle width direction, the outer door sash forming a glass guide for the door window;
- an inner door sash provided on an inner side of the door sash in the vehicle width direction, the inner door sash being coupled to an inner side of the outer door sash in the vehicle width direction; and
- an auxiliary bracket extending in a vehicle vertical direction on a rear portion of the door sash and interposed and coupled between the outer door sash and the inner door sash, wherein
- the auxiliary bracket is provided so as to cover a gap between the outer door sash and the inner door sash at an upper rear corner of the door sash, and
- the gap is formed above an outer door sash portion extending in a vehicle vertical direction, and on a vehicle front side relative to an inner door sash portion.

2. The vehicle door structure according to claim 1, wherein an inner space surrounded by the auxiliary bracket and the inner door sash is formed between at least one first coupling site at which the outer door sash is coupled to the auxiliary bracket and at least one second coupling site at which the inner door sash is coupled to the auxiliary bracket in the vehicle width direction.

3. The vehicle door structure according to claim 1, wherein the outer door sash is coupled to the auxiliary bracket at a first coupling site, and coupling the inner door sash the auxiliary bracket at a second coupling site.

4. The vehicle door structure according to claim 1, wherein the outer door sash, the inner door sash, and the auxiliary bracket is coupled to each other to form the closed cross-section.

5. The vehicle door structure according to claim 1, wherein the outer door sash is coupled to the auxiliary bracket at a plurality of first coupling sites, and coupling the inner door sash the auxiliary bracket at a plurality of second coupling sites,
- wherein the first and second coupling sites are disposed at predetermined intervals on the lower portion of the door sash.

6. The vehicle door structure according to claim 1, wherein the gap is separate from an inner space disposed inside the rear door sash, the inner space being surrounded by the outer door sash, the inner door sash, and the auxiliary bracket.

7. The vehicle door structure according to claim 2, wherein an interval between each two of the first coupling sites adjacent to each other in a vertical direction on the lower portion of the door sash is narrower than an interval between each two of the first coupling sites adjacent to each other in the vertical direction on the upper portion of the door sash.

8. The vehicle door structure according to claim 1, wherein an interval between each two of the second coupling sites adjacent to each other in a vertical direction on the lower portion of the door sash is narrower than an interval between each two of the coupling sites adjacent to each other in a vertical direction on the upper portion of the door sash.

9. The vehicle door structure according to claim 1, wherein a number of welded sites on the lower portion of the door sash is increased by reducing a interval between each two of the first coupling sites or second coupling sites adjacent to each other in the vertical direction.

10. The vehicle door structure according to claim 1, wherein the auxiliary bracket comprises an L-shaped metal plate.

11. A vehicle comprising the vehicle door structure according to claim 1.

12. A vehicle door structure comprising a door sash provided on an upper portion of a vehicle door and surrounding a door window, the door sash comprising:

- an outer door sash provided on an outer side of the door sash in a vehicle width direction, the outer door sash forming a glass guide for the door window;
- an inner door sash provided on an inner side of the door sash in the vehicle width direction, the inner door sash being coupled to an inner side of the outer door sash in the vehicle width direction; and
- an auxiliary bracket extending in a vehicle vertical direction on a rear portion of the door sash and interposed and coupled between the outer door sash and the inner door sash, wherein
- the auxiliary bracket is provided so as to cover a gap between the outer door sash and the inner door sash at an upper rear corner of the door sash,
- wherein an inner space surrounded by the auxiliary bracket and the inner door sash is formed between at least one first coupling site at which the outer door sash is coupled to the auxiliary bracket and at least one second coupling site at which the inner door sash is coupled to the auxiliary bracket in the vehicle width direction, and
- wherein
  - the at least one first coupling site comprises a plurality of first coupling sites, and the at least one second coupling site comprises a plurality of second coupling sites,
  - an interval between each two of the first coupling sites adjacent to each other in the vehicle vertical direction on a lower portion of the door sash is narrower than an interval between each two of the first coupling sites adjacent to each other in the vehicle vertical direction on an upper portion of the door sash, and
  - an interval between each two of the second coupling sites adjacent to each other in the vehicle vertical direction on the lower portion of the door sash is narrower than an interval between each two of the second coupling sites adjacent to each other in the vehicle vertical direction on the upper portion of the door sash.

13. A door sash provided on an upper portion of a vehicle door and surrounding a door window, the door sash comprising:

- an outer door sash provided on an outer side of the door sash in a vehicle width direction, the outer door sash forming a glass guide for the door window;
- an inner door sash provided on an inner side of the door sash in the vehicle width direction, the inner door sash being coupled to an inner side of the outer door sash in the vehicle width direction; and
- a plate extending in a vehicle vertical direction on a rear portion of the door sash and interposed and coupled between the outer door sash and the inner door sash, wherein
- the plate is provided so as to cover a gap between the outer door sash and the inner door sash at an upper rear corner of the door sash.

14. The door sash according to claim 13, wherein an inner space surrounded by the plate and the inner door sash is formed between at least one first coupling site at which the outer door sash is coupled to the plate and at least one second coupling site at which the inner door sash is coupled to the plate in the vehicle width direction.

15. The door sash according to claim 14, wherein the at least one first coupling site comprises a plurality of first coupling sites, and the at least one second coupling site comprises a plurality of second coupling sites,

- an interval between each two of the first coupling sites adjacent to each other in the vehicle vertical direction on a lower portion of the door sash is narrower than an interval between each two of the first coupling sites adjacent to each other in the vehicle vertical direction on an upper portion of the door sash.

16. The door sash according to claim 15, wherein an interval between each two of the second coupling sites adjacent to each other in the vehicle vertical direction on the lower portion of the door sash is narrower than an interval between each two of the second coupling sites adjacent to each other in the vehicle vertical direction on the upper portion of the door sash.

17. The door sash according to claim 13, wherein the outer door sash is coupled to the plate at a first coupling site, and coupling the inner door sash the plate at a second coupling site.

18. The door sash according to claim 13, wherein the outer door sash, the inner door sash, and the plate is coupled to each other to form the closed cross-section.

19. The door sash according to claim 13, wherein the outer door sash is coupled to the plate at a plurality of first coupling sites, and coupling the inner door sash the plate at a plurality of second coupling sites,

- wherein the first and second coupling sites are disposed at predetermined intervals on the lower portion of the door sash, and
- wherein the gap is separate from an inner space disposed inside the rear door sash, the inner space being surrounded by the outer door sash, the inner door sash, and the plate.

20. A vehicle comprising the door sash according to claim 13.

* * * * *